(12) United States Patent
Schidan et al.

(10) Patent No.: US 8,616,611 B2
(45) Date of Patent: Dec. 31, 2013

(54) DOOR MODULE FOR A VEHICLE DOOR, AND MOUNTING METHOD

(75) Inventors: Alexander Schidan, Solingen (DE); Milan Skultety, Kysucke Nove Mesto (SK); Thorsten Meyer, Krefeld (DE); Hans-Helmut Mieglitz, Monheim am Rhein (DE); Frank Zagromski, Witten (DE)

(73) Assignee: Johnson Controls GmbH & Co. KG, Burscheid (DE)

( * ) Notice: Subject to any disclaimer, the term of this patent is extended or adjusted under 35 U.S.C. 154(b) by 277 days.

(21) Appl. No.: 12/671,650

(22) PCT Filed: Aug. 1, 2008

(86) PCT No.: PCT/EP2008/006365
§ 371 (c)(1),
(2), (4) Date: Sep. 9, 2011

(87) PCT Pub. No.: WO2009/015903
PCT Pub. Date: Feb. 5, 2009

(65) Prior Publication Data
US 2011/0308172 A1 Dec. 22, 2011

(30) Foreign Application Priority Data

Aug. 1, 2007 (DE) .......................... 10 2007 036 455
Nov. 29, 2007 (DE) .......................... 10 2007 057 866
Jan. 30, 2008 (DE) .......................... 10 2008 006 589

(51) Int. Cl.
*B60J 5/00* (2006.01)

(52) U.S. Cl.
USPC ........................ 296/146.7; 49/502; 292/336.3

(58) Field of Classification Search
USPC ........................ 296/146.7; 49/502; 292/336.3
See application file for complete search history.

(56) References Cited

U.S. PATENT DOCUMENTS 4,653,143 A * 3/1987 Ketelhut et al. ............ 292/336.3

FOREIGN PATENT DOCUMENTS

| DE | 4237256 A1 | 5/1993 |
| DE | 4219460 A1 | 12/1993 |
| DE | 19837662 A1 | 4/1999 |
| DE | 19748021 A1 | 5/1999 |
| DE | 10144330 A1 | 4/2003 |
| FR | 2908806 A | 5/2008 |

OTHER PUBLICATIONS

WIPO, International Publication of the International Search Report, WO2009/015903, Jan. 19, 2009.

* cited by examiner

*Primary Examiner* — Dennis Pedder
(74) *Attorney, Agent, or Firm* — Michael Best & Friedrich LLP

(57) ABSTRACT

A door assembly for a vehicle includes a door frame and a door lock. A force transmitting mechanism has one end connected to the door lock and another end is premounted on a door module housing. The door module housing is mounted to the door frame and a trim panel secured to the door frame. A method includes the steps of premounting the door module to the door frame, securing the door panel to the door frame and connecting an door opening mechanism to the force transmitting mechanism.

8 Claims, 6 Drawing Sheets

DOOR MODULE FOR A VEHICLE DOOR, AND MOUNTING METHOD

CROSS REFERENCE TO RELATED APPLICATIONS

The present application is a U.S. National Stage filing of International Application No. PCT/EP2008/006365, filed on Aug. 1, 2008, titled "Door Module for a Vehicle Door, and Mounting Method" which claims the benefit of and priority to German Patent Application No. DE 10 2007 036 455.7, filed Aug. 1, 2007; German Patent Application No. DE 10 2007 057 866.2, filed Nov. 29, 2007; and German Patent Application No. DE 10 2008 006 589.7, filed Jan. 30, 2008, the entire disclosures of which are incorporated herein by reference.

BACKGROUND

The present disclosure relates generally to a vehicle door and in particular to a door module and a mounting method and a dismounting method.

Mounting of a door panel on the door frame of a vehicle includes a corresponding mounting sequence. An actuating means, such as a Bowden cable, may be guided upwards in the door frame from the lock, and be connected to a door lock located in the vehicle interior. This coupling process of the Bowden cable end with the door lock takes place in a cavity located between the door frame and the door trim panel. A manual operation such as hooking, clipping or the like is frequently required in this blind assembly, due to the short length of the Bowden cable. An additional consideration is that the secured coupling between the lock opening means and the door lock may influence opening in an emergency such as when the door lining and the door shell become separated from one another due to an applied force. The vehicle doors presently available are, however, relatively complicated and/or provide insufficient safety and/or inadequate dismounting conditions.

Thus there is a need in the art for a door trim panel and/or a vehicle door which is of simple construction and is easy to assemble and/or provides improved protection in the event of an application of an outside force to the door. Moreover, there is a need in the art for a simple assembly and/or disassembly method for the vehicle door.

SUMMARY

Accordingly, an exemplary embodiment relates to a door frame that includes a door lock and a force transmitting mechanism, one end of which is connected to the door lock, its other end being premounted to a door module housing.

The door frame is part of the vehicle bodywork and arranged thereon to be pivotably or displaceably moveable on one side. A door lock is connected to one end of a force and/or torque transmitting mechanism, for example a Bowden cable, by which the door lock may be opened from the vehicle interior. A door trim panel is mounted to the door frame and includes an opening means for the door lock.

The other end of the force transmitting mechanism is pre-assembled to a door module housing and is thus located in a defined position. In the case of a Bowden cable, the sheath of the Bowden cable is supported on the door module housing, whilst its core protrudes into the door module housing. The force transmitting mechanism is guided in the door module housing.

An advantage of the present disclosure is that a door module housing is arranged on the door frame using a connecting end that secures the housing at least in one spatial direction relative to the door shell. Another advantage is that the connection has relatively low connecting forces so that the door module housing does not alter its position during a subsequent mounting of a door trim panel on the door frame. Still another advantage is that when releasing the door trim panel from the door the housing to may be released from the door frame. For example, the connection is a snap connection or clip connection.

In another exemplary embodiment the door module housing is floatingly mounted to the door frame using at least one resilient means, which is arranged between the door shell and the housing to compensate for tolerances.

In yet another exemplary embodiment, the other end of the force transmitting means includes a connecting end for a non-positive and/or positive connection between the force transmitting mechanism and an opening mechanism for the door. In an example, the connecting end is a Bowden cable hook which is connected to the core of a Bowden cable.

The connecting means end may be guided in a slotted guide link which is arranged in an inner housing part, and is integrally connected to the outer housing part arranged in the door frame by means of resiliently deformable compensation elements. An advantage is that the connecting end is located in a defined position when secured to the opening mechanism and may not move out of alignment with the opening means when the connecting means performs a defined movement or when actuating the opening means. Advantageously, production tolerances may be increased at the same time, due to the resilient deformation of the compensation element, since deviations to the position in the X-direction, Y-direction and/or Z-direction may be compensated for.

In an exemplary embodiment, the opening mechanism includes a latching element for latching and a guide element for automatically producing the latching, so that a non-positive and/or positive connection is produced between the opening mechanism and force transmitting mechanism. Thus the connection is produced by moving the opening mechanism in the direction of the force transmitting mechanism during the mounting of the vehicle door, since the relative position between the opening mechanism and the force transmitting mechanism is fixed perpendicular to the direction of movement via the guide elements.

For example, the opening mechanism is a door opener cable, by which a tensile force may be produced, if required, which may be transmitted to the door lock to open the door lock. The cable is connected to a rotary lever. The opening means is positively and/or non-positively connected to the connecting end. Advantagously, this connection is produced without tools. For example, the connection may be a snap connection or clip connection.

In an exemplary embodiment, the opening mechanism is mounted rotatably, in a shell arranged on the inner door trim panel and connected to the door module housing such as by a snap closure or clip closure.

In an exemplary embodiment, the shell includes a guide member and the housing includes a corresponding counter guide element that cooperative when mounting the shell on the housing. Advantageously, the relative position of the shell and the door module housing is substantially fixed perpendicular to a door plane, so that the mounting process is simplified.

Still yet a further advantage of the present disclosure is that when releasing the connection between the door frame and the door trim panel, the connection between the force transmitting means and the opening mechanism is maintained and remains operational.

A further advantage of the present disclosure is that a method for mounting a door trim panel on a door frame is provided whereby a door module housing is premounted to the door frame, with one end of a force transmitting mechanism connected to a door lock and the other end being secured to the door module housing. The door panel is secured to the door frame. An opening mechanism on the door panel, is connected positively and/or non-positively to the force transmitting mechanism.

The method also teaches the step of removing the vehicle door and the connection between the housing and the shell is not released.

Other features and advantages of the present disclosure will be readily appreciated, as the same becomes better understood after reading the subsequent description taken in conjunction with the accompanying drawings.

DETAILED DESCRIPTION

Referring generally to the figures, a door assembly 25 is illustrated hereinafter, that allows for simplified initial mounting on the assembly line, and for improving the sequence of steps for mounting the entire door assembly together and, on the other hand, easy maintenance if required.

Figure 1:
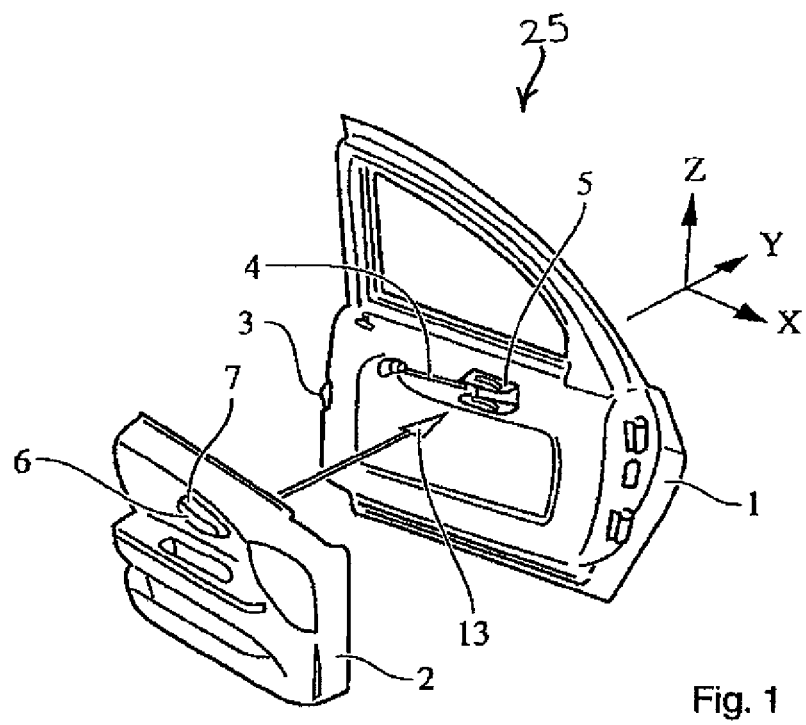
FIG. 1 is an exploded view of the door shell and the inner door trim panel.

FIG. 1 shows a door trim panel 2 which is intended to be mounted on a body 1, such as the door frame, in the direction of mounting, as shown at 13 (for example, the Y-direction). For coupling a door opening mechanism 6 to a door lock 3, a subsequently described sequence of a mounting method takes place which ensures straightforward initial mounting on the assembly line for the door assembly 25. This mounting process may take place as blind installation of the Bowden cable force transmitting mechanism to the door opening mechanism.

Figure 2:
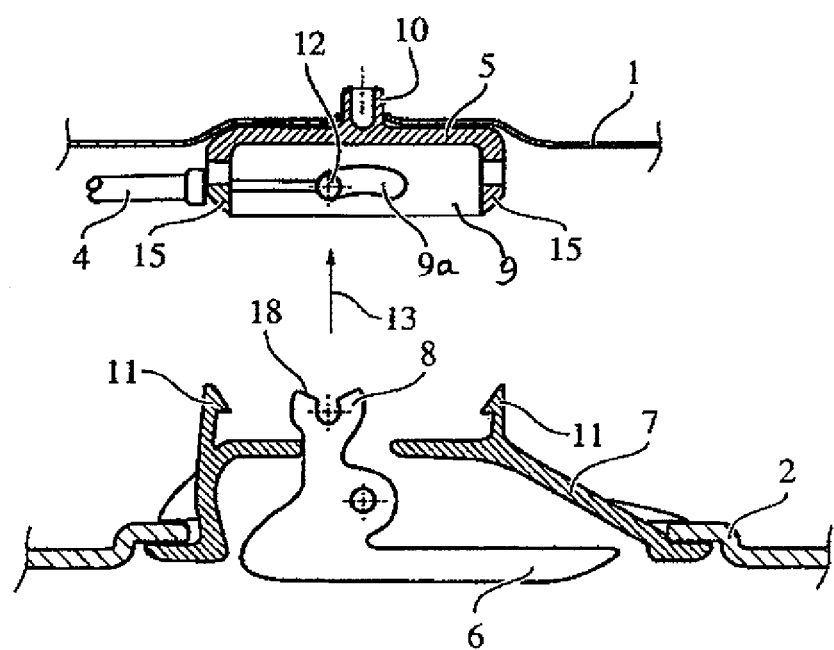
FIG. 2 is a top view of the force transmitting mechanism and the door opener before the connection thereof.
Figure 6:
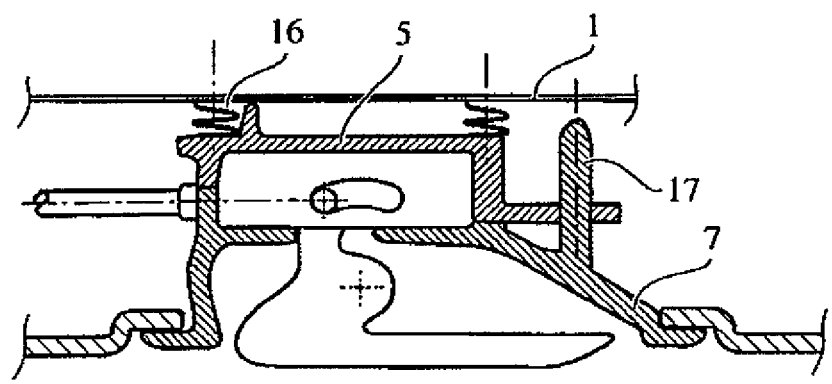
FIG. 6 is another exemplary embodiment illustrating a door housing that is floatingly mounted.

FIG. 2 shows the detail of the elements in a preassembled position involved in the coupling of the opener/lock. During mounting, the door trim panel 2 is moved in the direction of the arrow, the mounting direction 13 (Y) toward the door frame 1. The mounting direction Y is, however, merely given by way of example. The door module housing 5, which is visible, may be premounted on the door shell 1, such as by using a premounting element 10. The force transmitting mechanism or Bowden cable 4 is prefixed to the door module and door module housing 5 connected to the door lock, so that the sheath of the force transmitting mechanism or Bowden cable 4 is supported on the door module housing 5, whilst the core thereof protrudes into the door module housing 5. In another example, the door module housing 5 may also be floatingly mounted and connected to the door shell 1, if greater tolerances are desirable, and is shown in FIG. 6.

The core of the Bowden cable 4 has at an end remote from the door lock a connecting end 12 which is pre-attached to the door module housing 5. For example, the connecting end 12 may be a Bowden cable hook 12 or a Bowden cable drum or a Bowden cable ball, or the like. In the present example, the connecting end 12 is inserted and positioned in a slot 9a of a guide link 9.

The door opening mechanism 6 includes a leading coupling element 8 that is located in the direction of mounting 13 for engagement/coupling with the connecting end or Bowden cable hook 12 of this example. For easier coupling such as during blind assembly, the surfaces to be guided together may include an insertion bevel 18 on the coupling element 8. The coupling/connection between the opening mechanism 6 and the connecting end 12 takes place without tools, such as by a snap connection or clip connection.

Figure 3:
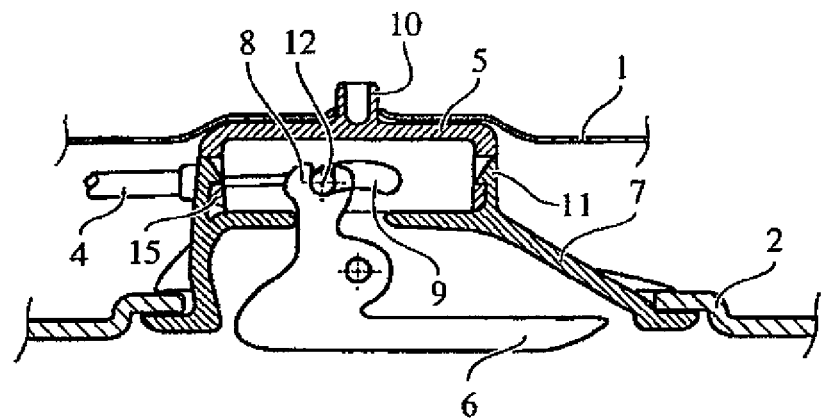
FIGS. 3 and 4 are top views illustrating the force transmitting mechanism and the door opener after the connection thereof.

FIG. 3 shows the completed mounting of the door assembly 25 including the door trim panel 2 on the door frame 1. The connection, shown by way of example, of the Bowden cable end 12 and the coupling element 8 on the lock opener 6 is illustrated. Moreover, during mounting the door module housing 5 is connected to a an opening mechanism housing arranged on the door trim panel 2. This connection takes place in the present example by securing the door module housing 5 to the opening mechanism housing 7 on the rear face. The positioning and connection of the parts may be carried out, by way of example, via corresponding insertion bevels 15 and latching lugs 11. In this position, the opening mechanism, Bowden cable or force transmitting mechanism and lock already form a fixed connection.

Figure 4:
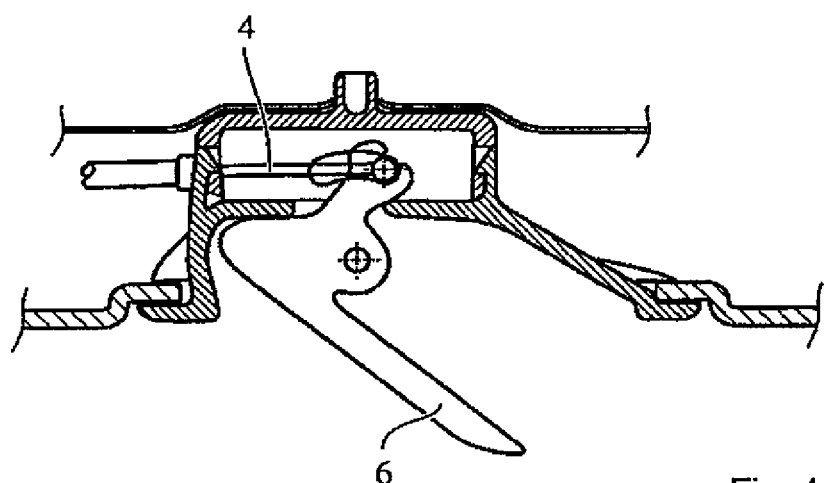

In FIG. 4 the door opening mechanism 6, and the force transmitting mechanism are shown in the operating position, i.e., in the tensioned and/or opening position. In operation, as the force transmitting mechanism or the Bowden cable 4 of this example is actuated or pulled, the lock is unlocked.

Figure 5:
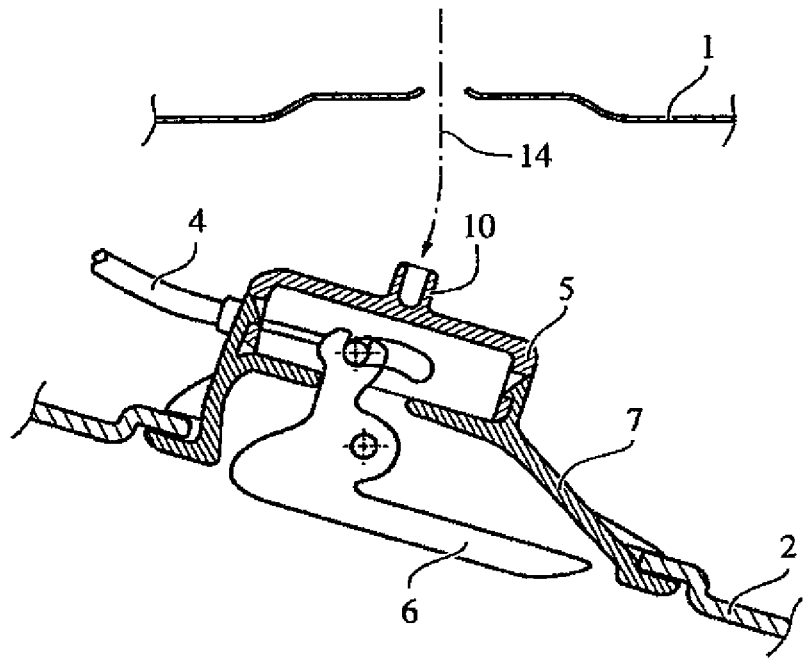
FIG. 5 is a top view illustrating removal of the inner door trim panel.

FIG. 5 shows an example of removal of the door trim panel 2 from the door frame 1, such as during maintenance and/or repair of the door assembly 25. The door module housing 5, opening mechanism housing 7 and door trim panel 2 have a compact arrangement. The individual mounting forces of the corresponding mounting elements are designed such that, in a systematic manner, easier unlocking of the premounting element 10 from the door frame is possible, rather than unclipping the door module housing 5 from the opening mechanism housing 7.

Thus a secure coupling of the force transmitting mechanism, such as the Bowden cable 4 of this example to the opening mechanism, or door handle 6 is produced. A prior uncoupling of the door module housing 5 from the opening mechanism housing 7 and thus from the opening mechanism 6 may be avoided.

FIG. 6 shows another exemplary embodiment, whereby the premounting on the door frame 1 being achieved by means of spring elements 16 for the floating mounting (tolerance absorption). In this example, positioning pins 17 are utilized to locate the door trim panel with the force transmitting mechanism and door frame.

Figure 7:
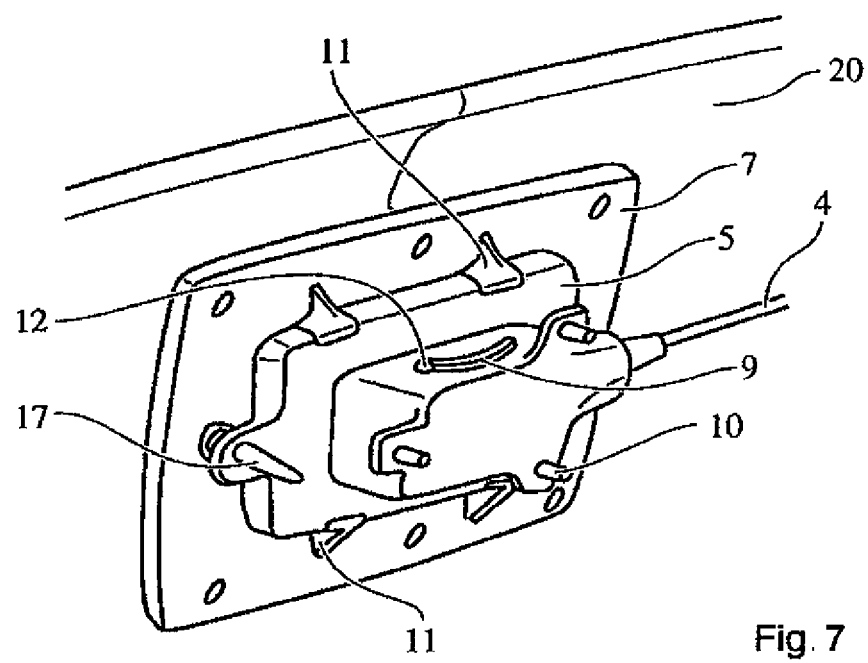
FIG. 7 is a perspective view of the rear face of a door module housing.

FIG. 7 shows a rear view, by way of example, of a door trim panel 2 with the door module housing 5 clipped onto door trim panel 2 and the opening mechanism housing 7 on the rear face in the operating position.

Figure 8:
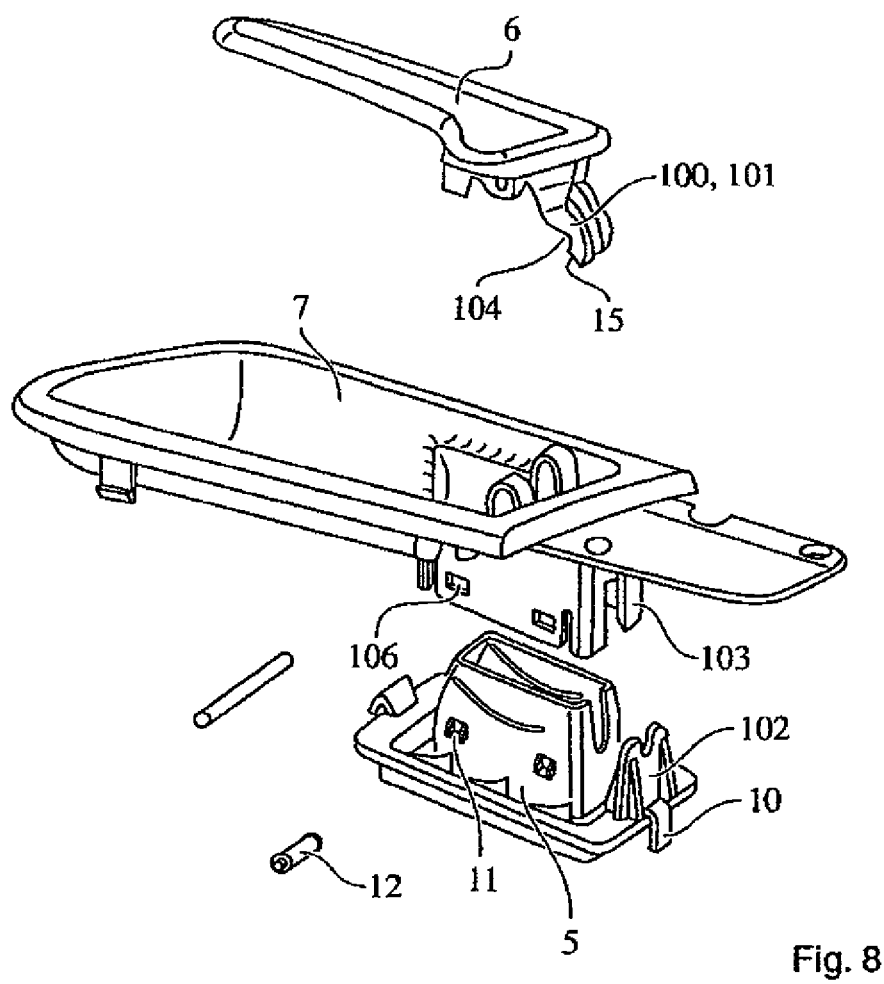
FIG. 8 is an exploded view of the door module assembly.

In FIG. 8, the opening mechanism 6, the opening mechanism housing 7, the connecting end 12 of the force transmitting mechanism 4 and the door module housing 5 are shown.

The opening mechanism 6 includes a guide member 101 and a latching element 100 for latching to the connecting end 12 of the force transmitting mechanism 4. The guide member 101 includes an insertion bevel 15, through which a connecting end 12 of the torque transmitting mechanism 4 is guided such that when mounting the shell 7 on the door module housing 5 the connecting end 12 of the force transmitting mechanism 4 is in engagement with a recess 104 formed by the latching element 100. The connecting end 12 of the force transmitting mechanism 4 is guided through a slotted guide link 9 the force transmitting mechanism housing 5. The door module housing 5 is fastened to the door frame 1, such as by a connecting means 10 in the form of clips to not illustrated. The door module housing 5 further includes a guide member 102 and the shell 3 includes a counter guide member 103, to locate or position the opening mechanism housing 7 relative to the door module housing 5 in a direction parallel to a door plane. The guide member 102 is substantially positively enclosed parallel to the door plane by the counter guide member 103. The opening mechanism housing 7 is fastened to the door module housing 5 using a snap closure. The snap closure may include latching lugs 11 disposed on the door module housing 5, which engage in a latching opening 106 formed in the opening mechanism housing 7.

Figure 9:
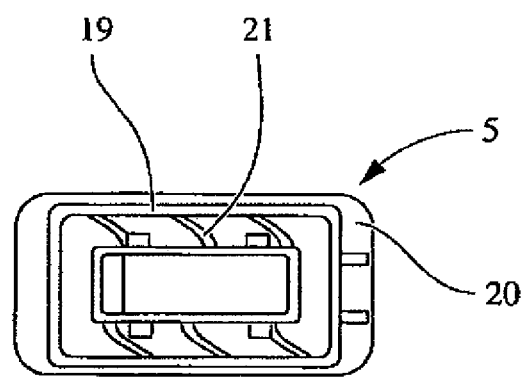
FIG. 9 is an elevational view of a housing from an inner housing part and an outer housing part, as well as a compensating element.

A door module housing 5 made of plastics is shown in FIG. 9. An outer housing part 20 is fastened to the door frame 1 and an inner housing part 19. The inner housing part 19 is received in a slotted guide link 9 formed in the connecting end 12 of the force transmitting mechanism 4 for premounting. The outer housing part 20 is spaced apart relative to the inner housing part 19 and connected therewith via a resiliently deformable compensation element 21. A resilient displacement between the outer housing part and the inner housing part 19 is possible to compensate for tolerances in the X-direction and Z-direction of the vehicle, whilst the compensation element 21 is preferably rigid in the Y-direction. The directional orientation refers to the conventional order of installation in the side doors of a vehicle.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practices other than as specifically described.

The invention claimed is:

1. A door assembly for a vehicle comprising:
   a door frame having a door module housing mounted thereto;
   a door lock;
   a force transmitting mechanism having a first end connected to the door lock and a second end mounted on the door module housing;
   a door trim panel having an opening mechanism housing mounted thereto; and
   an opening mechanism supported by the opening mechanism housing and including a coupling element for latching to the second end of the force transmitting mechanism and an insertion bevel on the coupling element for automatically producing the latching;
   wherein the opening mechanism housing includes a latching lug, wherein the door module housing includes an insertion bevel for receiving the latching lug as a snap closure for mounting the opening mechanism housing onto the door module housing, and wherein a first connecting force between the door module housing and the opening mechanism housing is greater than a second connecting force between the door module housing and the door frame.

2. The door assembly as set forth in claim 1, wherein the door module housing is secured on the door frame using a fastener.

3. The door assembly as set forth in claim 1, wherein the second end of the force transmitting mechanism includes a hook for connection with the coupling element.

4. The door assembly as set forth in claim 3, wherein the door module housing includes an outer housing part connected to the door frame, an inner housing part, and resiliently deformable compensation elements having a helical shape connecting the outer housing part and the inner housing part.

5. A method for mounting a door trim panel on a door frame for a vehicle door assembly, said method comprising the steps of:
   premounting a first end of a force transmitting mechanism to a door lock and a second end to a door module housing;
   premounting an opening mechanism housing to the door trim panel;
   securing the opening mechanism housing to the door module housing a snap closure; and
   attaching an opening mechanism supported within the opening mechanism housing to the second end of the force transmitting mechanism,
   wherein a first connecting force between the door module housing and the opening mechanism housing is greater than a second connecting force between the door module housing and the door frame.

6. The method of claim 5, wherein the step of attaching the opening mechanism to the second end of the force transmitting mechanism further includes automatically latching the opening mechanism to the second end of the force transmitting mechanism, wherein deviations in position are taken up by a resiliently deformable compensation element.

7. The method of claim 6, further comprising mutually guiding the opening mechanism housing toward the door module housing during the securing step using a latching lug on one of the opening mechanism housing and the door module housing and an insertion bevel on the other of the opening mechanism housing and the door module housing.

8. The method of claim 5, further comprising removing the door trim panel from the door frame while maintaining a connection between the door module housing and the opening mechanism housing when the door trim panel is displaced from the door frame.

* * * * *

UNITED STATES PATENT AND TRADEMARK OFFICE
CERTIFICATE OF CORRECTION

PATENT NO.         : 8,616,611 B2                    Page 1 of 1
APPLICATION NO. : 12/671650
DATED              : December 31, 2013
INVENTOR(S)       : Schidan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this
Twenty-second Day of September, 2015

Michelle K. Lee
*Director of the United States Patent and Trademark Office*